United States Patent
Crocker et al.

(10) Patent No.: US 9,835,764 B2
(45) Date of Patent: Dec. 5, 2017

(54) SYSTEM AND METHOD FOR THE CALIBRATION OF A HYDROPHONE LINE ARRAY

(71) Applicants: Steven E. Crocker, Bristol, RI (US); Daniel C. Casimiro, Mansfield, MA (US); Robert F. Cutler, Tiverton, RI (US); Ronald R. Smalley, North Kingstown, RI (US)

(72) Inventors: Steven E. Crocker, Bristol, RI (US); Daniel C. Casimiro, Mansfield, MA (US); Robert F. Cutler, Tiverton, RI (US); Ronald R. Smalley, North Kingstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 645 days.

(21) Appl. No.: 14/496,228

(22) Filed: Sep. 25, 2014

(65) Prior Publication Data

US 2016/0091361 A1 Mar. 31, 2016

(51) Int. Cl.
*H04B 17/00* (2015.01)
*G01V 13/00* (2006.01)

(52) U.S. Cl.
CPC .................... *G01V 13/00* (2013.01)

(58) Field of Classification Search
USPC .......................................................... 367/13
See application file for complete search history.

(56) References Cited

U.S. PATENT DOCUMENTS 3,119,407 A * 1/1964 Timmerman, Sr. .... B65D 90/26
137/236.1

3,859,620 A * 1/1975 Percy ..................... G01V 13/00
181/112

(Continued)

FOREIGN PATENT DOCUMENTS

JP         2016091361 A  *  5/2016
WO   WO 2016091361 A1 *  6/2016  .............. G06F 3/011

OTHER PUBLICATIONS

Cron, Benjamin F., and Charles H. Sherman. "Spatial-Correlation Functions for Various Noise Models." The Journal of the Acoustical Society of America 34.11 (1962): 1732-1736.*

(Continued)

*Primary Examiner* — James R Hulka
*Assistant Examiner* — Jonathan D Armstrong
(74) *Attorney, Agent, or Firm* — James M. Kasischke; Michael P. Stanley

(57) ABSTRACT

A method is disclosed for calibration of a towed line array. In a low frequency band, calibration is performed using an acoustic field observed by reference standard hydrophones. The observations form a model of a complex acoustic field throughout a space occupied by a measurement apparatus. The array sensitivities are computed by comparing output voltages of the array with the acoustic field estimated at the locations occupied by hydrophones of the array. Variations in the acoustic field that cannot be accounted for by free field propagation theory are included in the calculation of array channel sensitivities. The method extends the low frequency limit for the calibration to less than the minimum frequency at which free field propagation conditions can be approximated. Boundary reflections and spatial variations in the acoustic field are recognized. The spatial distribution of acoustic energy is used to provide low frequency calibration with improved precision.

6 Claims, 4 Drawing Sheets

(56) References Cited

U.S. PATENT DOCUMENTS

| | | | | |
|---|---|---|---|---|
| 4,160,228 A * | 7/1979 | Hix | ................. | G01V 1/20 |
| | | | | 181/110 |
| 6,208,584 B1 * | 3/2001 | Skinner | ................. | G01H 3/005 |
| | | | | 367/13 |
| 8,576,657 B1 * | 11/2013 | Crocker | ................. | G01V 13/00 |
| | | | | 367/13 |
| 9,001,614 B1 * | 4/2015 | Crocker | ................. | G01V 13/00 |
| | | | | 367/124 |
| 9,551,811 B1 * | 1/2017 | Crocker | ................. | G01V 13/00 |

OTHER PUBLICATIONS

Barnes, E. A. Research, Development, and Calibration Activities. No. USRL-3-62. Navy Underwater Sound Reference Lab Orlando FL, 1962.*

Bobber, Robert J. Underwater electroacoustic measurements. Naval Research Lab Orlando FL Underwater Sound Reference DIV, 1970.*

Merklinger, H. M. "Automatic comparison calibration of hydrophones using the ambient noise background." The Journal of the Acoustical Society of America 60.S1 (1976): S25-S25.*

McMahon, G. W. "Complex hydrophone calibrations using pseudo-Gaussian noise signals." The Journal of the Acoustical Society of America 61.S1 (1977): S83-S83.*

Crocker, Steven E., and Frank D. Fratantonio. Characteristics of Sounds Emitted During High-Resolution Marine Geophysical Surveys. Naval Undersea Warfare Center Division Newport United States, Report Date: May 8, 2016.*

Crocker, Steven E., and Ronald R. Smalley. "Calibration of a Digital Hydrophone Line Array at Low Frequency." IEEE Journal of Oceanic Engineering 41.4 (2016): 1020-1027.*

Krukowski, Jerzy, Andrzej Maczynski, and Marek Szczotka. "The influence of a shock absorber on dynamics of an offshore pedestal crane." Journal of Theoretical and Applied Mechanics 50.4 (2012): 953-966.*

* cited by examiner

SYSTEM AND METHOD FOR THE
CALIBRATION OF A HYDROPHONE LINE
ARRAY

STATEMENT OF GOVERNMENT INTEREST

The invention described herein may be manufactured and used by or for the Government of the United States of America for governmental purposes without the payment of any royalties thereon or therefore.

This application claims the benefit of U.S. Provisional Patent Application No. 61/885,769; filed on Oct. 2, 2013 by the inventors, Steven E. Crocker, Daniel C. Casimiro, Robert F. Cutler, Ronald R. Smalley and entitled "METHOD FOR THE CALIBRATION OF A HYDROPHONE LINE ARRAY"

BACKGROUND OF THE INVENTION (1) Field of the Invention

The present invention is a comparison calibration of hydrophone data channels in a towed line array of hydrophones in which the comparison calibration extends a low frequency limit that is applicable to existing calibration methods that seek to approximate free field propagation in open water.

(2) Description of the Prior Art

Among the principle challenges in the calibration of a hydrophone towed line array is the large size of the array itself. Hydrophone line arrays can have lengths of hundreds (or thousands) of meters. Thus, acoustic calibration of hydrophone line arrays under controlled laboratory conditions is not generally practiced (nor feasible).

Calibration of a towed hydrophone line array is typically performed using a comparison method. When calibrating, one of more reference standard hydrophones with a known free field voltage sensitivity (FFVS) are used to measure an acoustic field that is transmitted by an acoustic projector at one or more locations in the vicinity of a test article (the towed hydrophone line array). The FFVS is a complex quantity with a magnitude and a phase. The magnitude is traditionally expressed as decibels relative to one volt per micro Pascal (e.g., dB re 1 V/uPa) and the phase is expressed in degrees.

A problem when using acoustic free field or gated continuous wave calibration techniques for towed line arrays is the low frequency limit that is imposed by a requirement for reflection free signals. Various methods have been developed to calculate the FFVS of large numbers of hydrophones distributed over the length of the towed line arrays [See L. J. Hix "Method and Apparatus for Testing Marine Seismic Cables" U.S. Pat. No. 4,160,228].

The Hix reference discloses a method by which the array to be calibrated is towed past a stationary acoustic projector in an open body of water. The acoustic projector transmits acoustic signals with known properties. The electrical outputs of the array hydrophones are recorded on the tow ship where individual channel outputs are compared with one another. Since the channel outputs are not compared to a calibrated reference standard; the FFVS of the array channels are not provided. This practice is often referred to as a relative calibration.

In Skinner ("Place Calibration of Sonar Receive Array"; U.S. Pat. No. 6,208,584), a method is disclosed whereby both a test article and an acoustic projector are towed behind a ship in an open body of water. The method compares the magnitude and phase of the hydrophone channel outputs in the test article. However, an independent reference standard hydrophone is not used; therefore, the FFVS is not provided by this relative calibration method.

Percy ("Hydrophone Line Array Calibration Unit", U.S. Pat. No. 3,959,620) teaches a method by which a hydrophone line array is affixed to a cylindrically shaped wire mesh framework. One calibrated reference standard hydrophone is also affixed to the framework to provide an absolute reference for comparison. This practice is often referred to as an absolute calibration.

The Percy reference includes an acoustic projector located at an approximate geometric center of the cylindrical test fixture. The acoustic projector is used to transmit acoustic interrogation signals to a test article and reference hydrophone. The cited reference does not teach a method of support for the acoustic projector to prevent the transmission of vibration into the cylindrical test fixture, array and reference standard hydrophone. Such vibrations tend to corrupt the received acoustic data; thus, introducing both random and systematic errors into the calibration result.

The Percy reference also assumes the existence of an acoustically non-reflective test tank in which the calibration is performed over a frequency range of 10 to 1000 Hz. The cited reference does not teach a method to create acoustically non-reflective test tank surfaces, nor is a method taught to render the water surface to be acoustically non-reflective. Acoustic test tanks with the non-reflective properties assumed by the Percy reference are not known in the prior art. Thus, acoustic data will likely contain contributions from reflected acoustic energy with commensurate errors in the FFVS computed for the array hydrophone channels.

Most acoustic calibration procedures, including those taught by the Hix, Skinner, and Percy references; tacitly assume that the properties of the acoustic field are known to arbitrary precision. Indeed, this is typically the case for calibration tests conducted in the highly controlled environment of an enclosed laboratory. However, this is rarely the case for calibrations performed in open water where boundary reflections may be unavoidable.

When performing acoustic measurement in an open body of water (such as lakes, ponds and pools used by acoustic test facilities); there exists a minimum frequency at which free field propagation can be simulated by appropriate gating of the time series signals such that reflections from the boundaries (surface, bottom and sides) can be excluded. Above this limiting frequency, a time gated acoustic waveform can be transmitted and received on the reference standard hydrophones and the array hydrophones (test article) under approximately free field conditions.

Reflections from the surface or other boundaries are eliminated by appropriate time gating of the received signals. In this frequency band, calibration of the test article can be performed using techniques taught by the prior art [See "American National Standard: Procedures for Calibration of Underwater Electroacoustic Transducers", ANSI/ASA S1.20-2012].

As discussed previously, this method has a low frequency limit governed by the requirement to approximate free field conditions. At lower frequencies, it is not possible to collect time series data of sufficient length without including acoustic field components that are reflected from the water surface or other boundaries.

SUMMARY OF THE INVENTION

The present invention discloses a method for comparison calibration of hydrophone data channels in a towed line array comprising individual hydrophones (or interconnected groups thereof). The free field voltage sensitivity (FFVS) of a hydrophone channel is defined for the purposes of this invention as the ratio of the complex voltage (e.g. magnitude and phase) output by the hydrophone and the complex acoustic pressure in the vicinity of the hydrophone. "Complex" quantities as used in the present invention indicate that a quantity has both a magnitude and a phase (or real and imaginary part) in the mathematical sense.

The method provides transmission of a continuous Gaussian noise waveform such that the statistics of the acoustic field in the volume of water occupied by a measurement apparatus or testing device are stationary. In this frequency band, the calibration is performed using a novel representation of the acoustic field observed by a plurality of calibrated reference standard hydrophones.

These acoustic field observations are used to form an empirical model of the complex acoustic field (e.g. magnitude and phase) throughout the spatial domain occupied by the measurement apparatus or testing device. "Empirical" as used in the present invention is based on or concerned with, or verifiable by observation or experience rather than theory or pure logic. The empirical model is based on the observed data, and does not assume a particular solution to the acoustic wave equation when describing the geometry of the acoustic field.

The test article sensitivities are then computed by a comparison of output voltages of the test article with the acoustic field estimated at the locations occupied by hydrophones of the test article. Spatial variations in the acoustic field that cannot be accounted for by free field propagation theory (e.g. boundary reflections) are observed and included in the calculation of array channel sensitivities.

The method extends the low frequency limit for the calibration to substantially less than the minimum frequency at which free field propagation conditions can be approximated. The low frequency limit is determined by the minimum operating frequencies of the acoustic projector, the reference standard hydrophone, and/or the test article. The high frequency limit is determined by the spatial sampling density of the reference standard hydrophones. The nominal effective bandwidth when using eight reference standard hydrophones to monitor signals transmitted by a low frequency acoustic projector in the range of 20 to 300 Hz.

A principle difference between the prior art and the present invention is the employment of a non-idealized representation of the acoustic field used to interrogate the test article. The method of the present invention extends the low frequency calibration limit to well below the frequency at which it is possible to approximate free field propagation in open water.

The prior art presumes the existence of an acoustic field propagating into free space without any contribution or disturbance from boundary reflections. The present invention explicitly recognizes the existence of boundary reflections and the resultant spatial variations in the acoustic field. The spatial distribution of acoustic energy is observed and used to provide low frequency calibration with improved precision and accuracy despite the presence of reflected acoustic energy.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
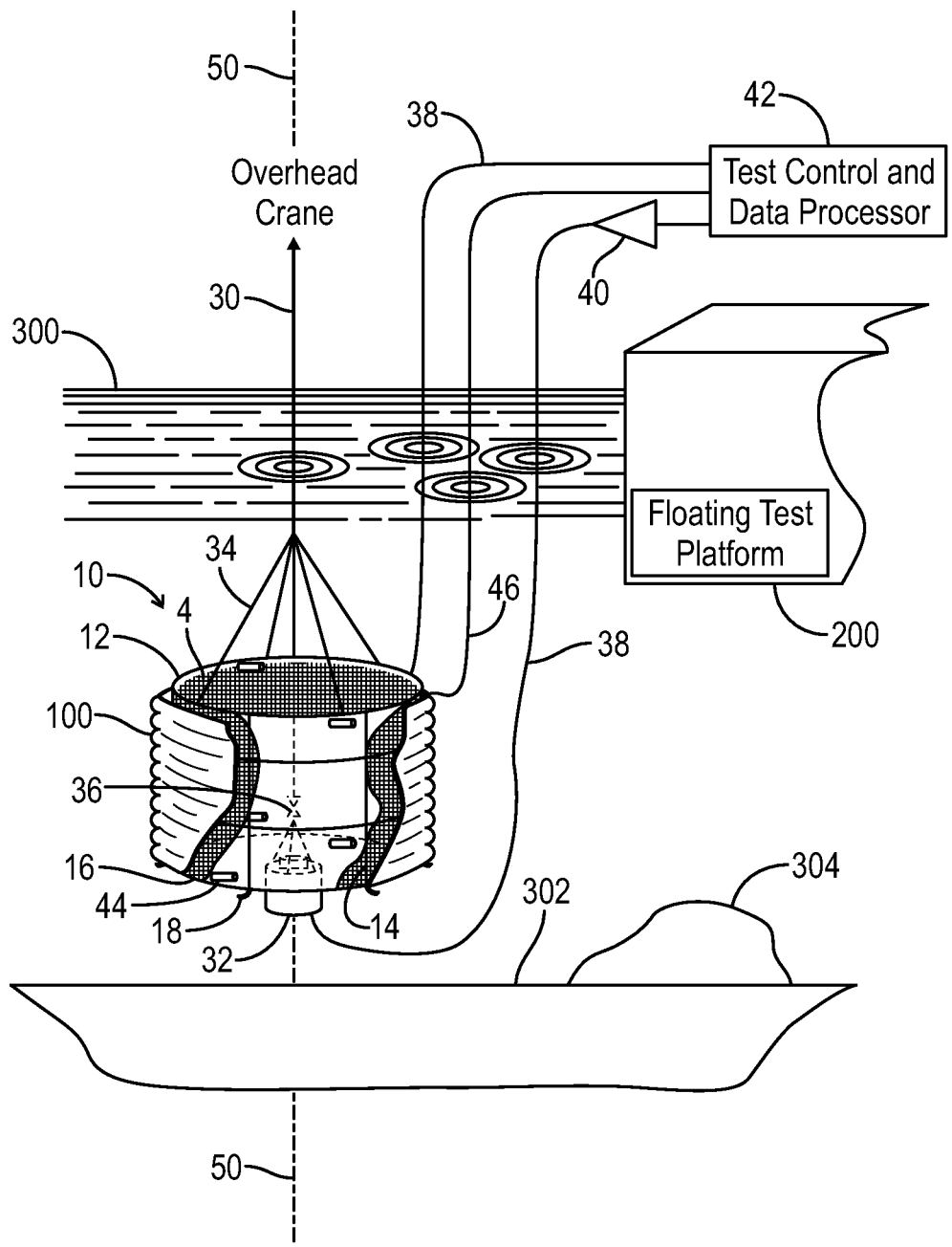
FIG. 1 depicts a hydrophone line array (a test article) helically affixed to a measurement apparatus of the present invention.

Referring to the figures, FIG. 1 depicts a hydrophone line array 100 (a test article) helically affixed to a measurement apparatus 10 (test fixture) composed of hollow circular tubes 12 joined by vertical supports 14 and covered with a wire mesh 16 that is substantially open to the passage of acoustic waves Both the circular tubes 12 and the vertical supports 14 are perforated by a plurality of holes that allow water to enter and air to escape when the measurement apparatus 10 and the test article 100 are submerged. In this way, reflection and scattering of acoustic energy from the test article 100 is reduced.

A plurality of brackets 18 are arranged at the bottom of the measurement apparatus 10 to support the test article 100 as the test article is installed onto the outer surface of the apparatus. The test article 100 is affixed to the measurement apparatus 10 using tie-wraps (not shown) or similar securing devices. The measurement apparatus 10 can be raised and lowered using a cable and sling 30 with the aid of an overhead crane (not shown).

An acoustic projector 32 is used to transmit the acoustic signals into the water in the vicinity of the measurement apparatus 10. The acoustic projector 32 is suspended from a lifting device 34 that is attached to the sling 30 and supports the measurement apparatus 10. The lifting device 34 includes a vibration isolator 36 for reducing the amplitude of vibrations that are transmitted from the acoustic projector 32 thru the sling 30 to the measurement apparatus 10 and ultimately to the hydrophone line array (test article 100) being calibrated.

The vibration isolator 36 includes an elastic strap with tensile strength sufficient to attenuate the transmission of vibration along its length. Suitable vibration isolators are known in the art. In this instance and by using a standard vibration isolator, the static deflection when supporting the acoustic projector 32 in air is minor as compared to the size of the measurement apparatus 10 (approximately eight centimeters in this instance). The cutoff frequency for the example vibration isolator 36 would be less than three Hz. Thus, vibration at frequencies greater than three Hz are substantially attenuated and isolated from the measurement apparatus 10. Other realizations for the vibration isolator 36 are not excluded from this invention and should be obvious to those familiar with vibration isolator techniques.

Amplified electrical signals are provided to the acoustic projector 32 thru cables 38 that are interfaced to a power amplifier 40. A test control and data processor 42 generates the electronic signals that are input to the power amplifier 40.

In operation, acoustic signals are received on a plurality of calibrated reference standard hydrophones 44. For the purposes of this invention, a calibrated reference hydrophone is simply a hydrophone that has been caibrated via some other means that is traceable to United States' standards through the National Institutes of Standards and Technology (NIST). Calibrated reference standard hydrophones are commercially available and known to those ordinarily skilled in the art.

A typical embodiment includes six to eight such hydrophones distributed over an inner surface of the measurement apparatus 10. Electrical signals from the reference hydrophones 44 are transmitted over the cable 38 and received by the processor 42. Electrical signals from the test article 100 are transmitted over a transmitting cable 46 and is received by the processor 42. The measurement is performed from a floating test platform 200 that supports the equipment used to assemble and lower the measurement apparatus 10 into the water. The test platform 200 may include an enclosed laboratory space that houses the processor 42 and the power amplifier 40. A common scenario employs a simple barge that is moored to the bottom or to the shore to maintain position and includes an enclosed laboratory space.

Acoustic data collected during the calibration measurement may be influenced by the presence of reflecting boundaries such as the platform 200, water surface 300, bottom 302 and any such objects as rocks 304 on or within the bottom.

Figure 2:
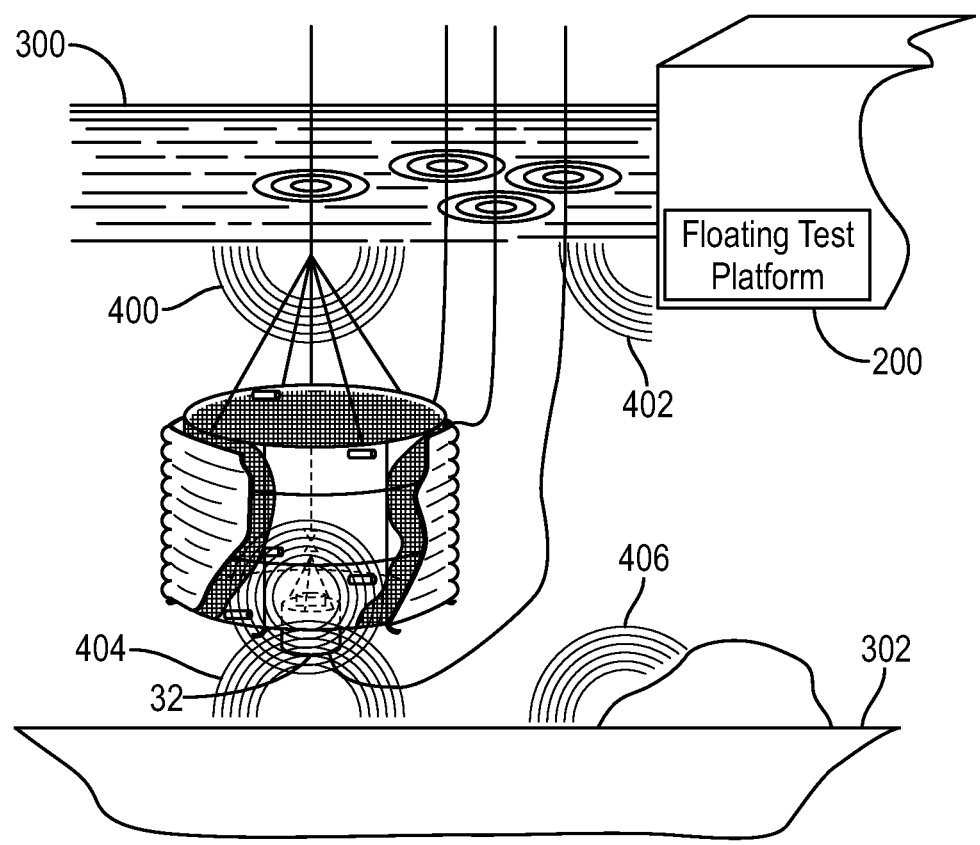
FIG. 2 depicts a representative set of acoustic field components that are present when testing.

FIG. 2 illustrates a representative set of acoustic field components that are present when testing at frequencies that are less than that at which boundary reflections can be precluded by appropriate time gating of received signals. Essentially, this figure recognizes the existence of boundary reflections. The acoustic field radiated directly from the acoustic projector 32 prior to interaction with boundaries or other structures is generally representative of free field propoagation.

The prior art teaches various methods for the calibration of a hydrophone line array in an open body of water. These methods assume that this is the only acoustic field component present, or that all other field components combined, provide a neglible contribution to the acoustic field observed by the reference standard hydrophones and the line array. Other field components that are typically present at low frequency include surface reflection 400, a contribution from a corner reflection 402 formed at the intersection of the floating test platform 200 with the water surface 300, a bottom reflection 404 and reflections 406 from other objects on or embedded in the bottom 302.

While information about the distribution and properties of these field components is frequently not adequate to develop an accurate, deterministic model of the acoustic environment; neglecting the field components can produce significant errors in the FFVS calculated for the hydrophone channels of the line array 100. It is the intent of the invention to improve the precision and accuracy of the calibration result by accounting for the field components that are present, despite the absence of information needed to develop a deterministic physical model of the acoustic field.

The data channels of a hydrophone line array may number in the hundreds. The data required to compute the FFVS of these channels are collected simultaneously. The method begins with the generation of a signal with the properties of continuous broadband Gaussian noise. The signal is amplified and transmitted into the water by an acoustic projector such that the statistics of the acoustic field in the volume of water occupied by the measurement equipment are stationary.

Data provided by a plurality of calibrated reference standard hydrophones are processed using standard signal processing techniques to estimate the acoustic transfer functions between one of the reference standard hydrophones designated as the principle reference and all other reference standard hydrophones designated as auxiliary references. The acoustic transfer function $H_{pn}$ between the principle reference p and the $n^{th}$ reference located at azimuth angle $\theta_n$ and vertical displacement $z_n$ is given as the ratio of the cross spectrum $P_{np}$ and the autospectrum $P_{pp}$ of the principle reference as shown in Equation (1).

$$H_{pn}(f, \theta_n, z_n) = \frac{P_{np}(f)}{P_{pp}(f)} \quad (1)$$

Frequency dependent, complex acosutic transfer functions computed using Equation (1) are then interpolated over the domain of azimuth θ and vertical displacement z that is occupied by the calibrated reference standard hydrophones on a frequency-by-frequency basis. The result is a purely empirical, frequency dependent model of acoustic wave field variations on the surface of the measurement apparatus 10. By directly observing the acoustic transfer functions over the surface of the measurement apparatus 10, the contributions from scattering and reflections are observed in addition to the direct path (or free field).

Figure 3:
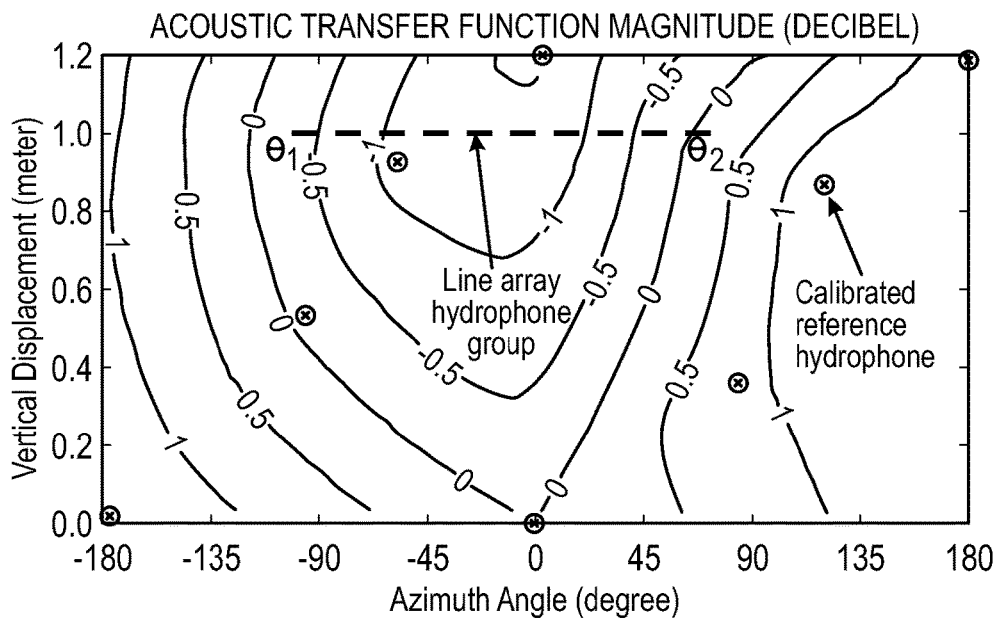
FIG. 3 illustrates a magnitude of complex acoustic transfer function over a surface of a measurement apparatus relative to a principle reference hydrophone located at an azimuth angle of zero degrees and a vertical displacement of zero meters.

FIG. 3 illustrates the magnitude of the complex acoustic transfer function over the cylindrical surface of the measurement apparatus 10 relative to the principle reference hydrophone located at an azimuth angle of zero degrees and a vertical displacement of zero meters. The radiating surface of the acoustic projector 32 is located on a longitudinal centerline 50 of the measurement apparatus 10 and at a vertical displacement of zero meters. The locations of eight reference standard hydrophones are illustrated with markers (e.g. Cross-hatched circles).

Figure 4:
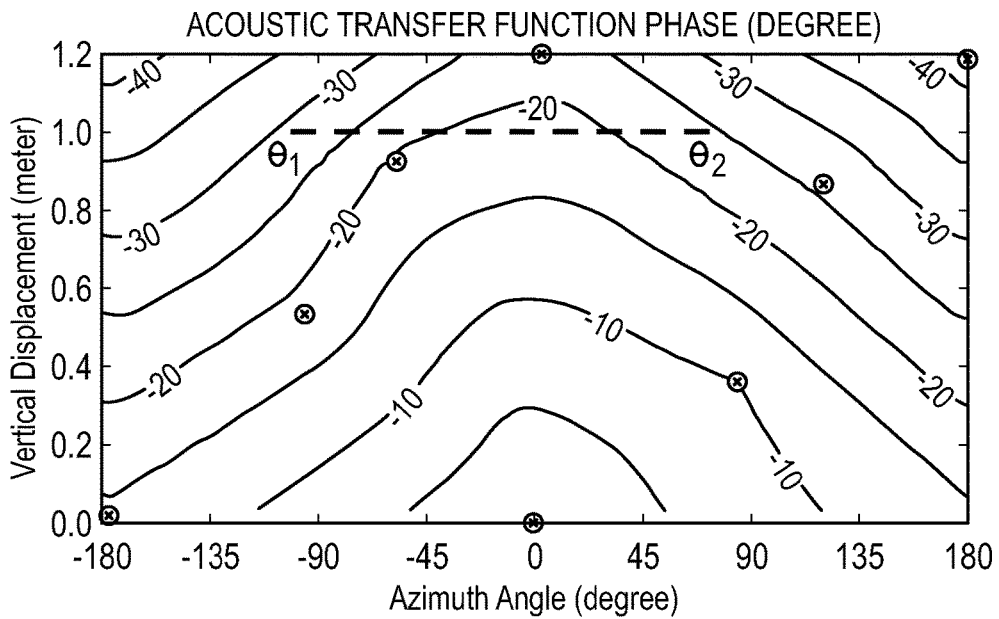
FIG. 4 illustrates a phase of complex acoustic transfer function over a surface of a measurement apparatus relative to a principle reference hydrophone located at an azimuth angle of zero degrees and a vertical displacement of zero meters and which shows that the corresponding variation on phase was more than fifteen degrees.

The figure shows that the acoustic field magnitude was not constant around the circumference of the measurement apparatus 10 as would be the case for propagation into free space without boundary reflections. On the contrary, azimuthal variations of more than two decibels were observed at a vertical displacement of one meter. FIG. 4 shows that the corresponding variation in phase was more than fifteen degrees.

Calibration methods using a single reference standard hydrophone fixed to the surface of the measurement apparatus 10 will carry azimuthal variations in magnitude and phase directly into the calculation of FFVS as an error.

The complex, frequency dependent FFVS of the $i^{th}$ sensor $M_i(f)$ in a hydrophone line array is given by Equation (2):

$$M_i(f) = \frac{V_i(f)}{V_p(f)} \frac{M_p(f)}{H_{pi}(f, \theta_i, z_i)} \quad (2)$$

where $M_p$ and $V_p$ are the FFVS and voltage observed on the principle reference standard hydrophone 44. The voltage observed on the $i^{th}$ hydrophone of the line array is $V_i$. The acoustic transfer function $P_{pi}$ between the principle reference standard hydrophone 44 and the location of the $i^{th}$ line array hydrophone is provided by the empirical model of the acoustic field variation on the surface of the measurement apparatus 10 as illustrated in FIG. 3 and FIG. 4. All quantities in Equation (1) and (2) are complex valued. Equation (2) applies to the calculation of the FFVS for a single hydrophone in a towed line array.

Modification of Equation (2) is required when one or more data channels of the array are formed from a group of interconnected hydrophones that span a finite length as is done when spatial averaging is used as a noise reduction strategy. Equation (3) provides the FFVS when the $i^{th}$ data channel is composed on an interconnected group of hydrophones that spans a length L along the longitudinal axis of the line array 100. The value of the complex acoustic transfer function $H_{pi}$ is replaced by the average value of the acoustic transfer function over the curve spanned by the hydrophone group.

The average value is represented by the line integral in the denominator of Equation (3) where the length of the hydrophone group is L and R is the radius of the cylindrical test fixture. The end points of the hydrophone group are located at azimuth angles $\theta_1$ and $\theta_2$. The vertical displacement of the group is assumed constant. The curve over which the integration is carried out is illustrated in FIG. 3 and FIG. 4 where the hydrophone group spans an arc length that is roughly half the circumference of the measurement apparatus 10. Standard mathematic methods are used to estimate the value of the line integral and resultant average value for the acoustic transfer function on the curve spanned by a hydrophone group.

$$M_i(f) = \frac{V_i(f)}{V_p(f)} \frac{M_p(f)}{\frac{R}{L}\int_{\theta_i}^{\theta_2} H_{pi}(f, \theta, z)d\theta} \quad (3)$$

where $M_p$ and $V_p$ are the FFVS and voltage observed on the principle reference standard hydrophone. The voltage observed on the $i^{th}$ hydrophone group of the line array is $V_i$. The acoustic transfer function $H_{pi}$ between the principle reference standard hydrophone and all points on the surface of the measurement apparatus 10 is integrated between the angular limits $\theta_1$ and $\theta_2$ spanned by the hydrophone group length of L. R is the radius of the measurement apparatus 10. The vertical displacement $z_i$ of the $i^{th}$ hydrophone group is assumed constant and f is the frequency.

The method taught by this invention provides for in situ verification of the accuracy and precision achieved when calibrating an array. The verification is accomplished by treating one reference standard hydrophone as the test article 100 to be calibrated (used as a surrogate). Calculations described above are performed using the remaining reference standard hydrophones. The resulting FFVS is compared to the known FFVS for the reference standard hydrophone. This process is repeated for each of the reference standard hydrophones in a process commonly referred to as a round robin calibration.

Figure 5:
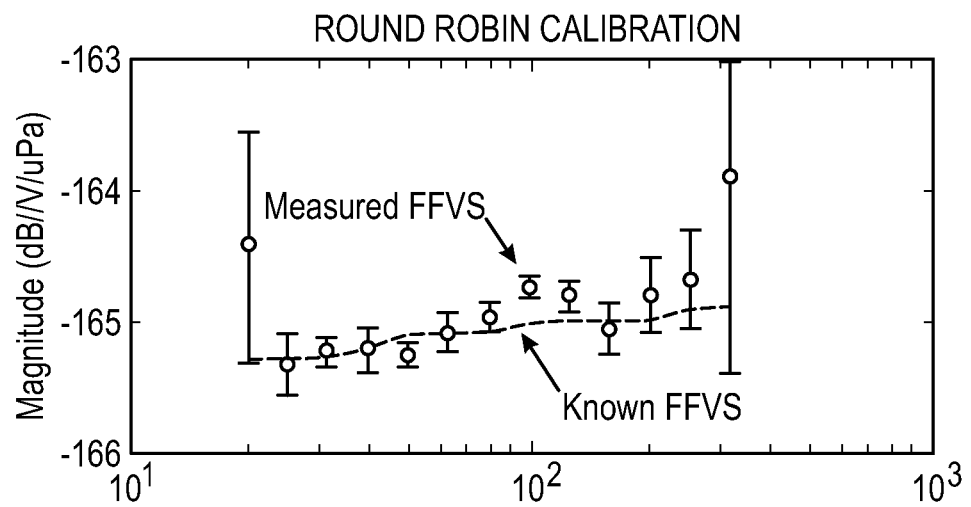
FIG. 5 illustrates the result of one round robin calibration with frequency compared to magnitude.
Figure 6:
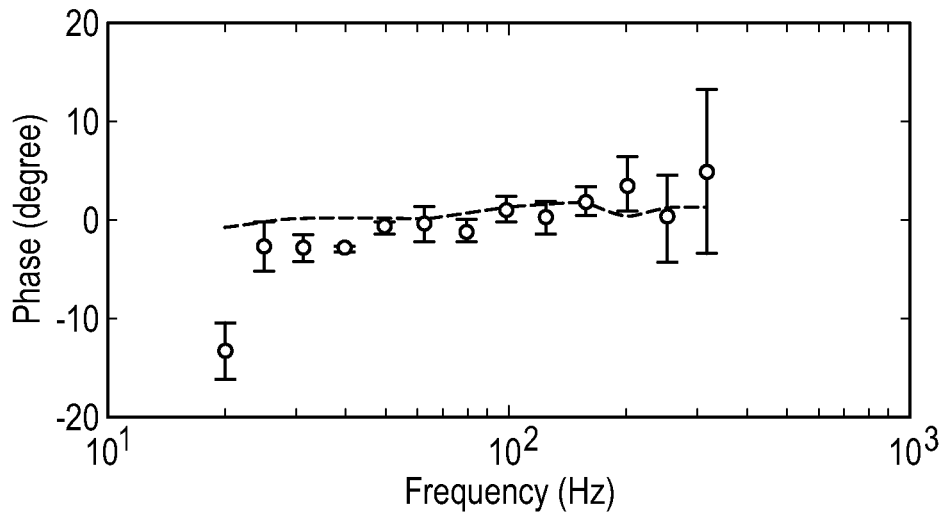
FIG. 6 illustrates the result of one round robin calibration with frequency compared to phase.

Errors in the round robin calibrations of the reference standard hydrophones are then used to characterize the measurement uncertainty for the data channels of the test article 100 using standard statistical methods. FIG. 5 illustrates the result of one round robin calibration with frequency compared to magnitude and FIG. 6 illustrates the result of one round robin calibration with frequency compared to phase. As shown in the figures, errors in magnitude and phase of the FFVS are a fraction of one decibel over most of the frequency band. The limits over which an accurate calibration was achieved using this method are easily identifiable by the increase in the calibration uncertainty (e.g. error bars) at the minimum and maximum frequencies.

The present invention discloses a method to measure the complex sensitivity of data channels in a towed hydrophone line array. The major advantages are improved accuracy and precision at low frequency. Calibration methods described in the prior art presume free field acoustic propagation. The method of the invention observes and compensates for the actual acoustic field, including acoustic energy that is reflected from the surface, the floating test platform, the bottom and any other factors that would violate the acoustic free field assumption. In addition, the calibration method disclosed employs a vibration isolator in the lifting apparatus for the acoustic projector to isolate and attenuate vibrations that would otherwise contaminate the acoustic data collected with the test article and calibrated reference hydrophones.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for calibration of free field voltage sensitivity of hydrophone data channels in a towed line array, said method comprising the steps of:

providing a measurement apparatus with a cylindrical surface with said apparatus as a frame support with a defined radial boundary and a plurality of calibrated reference standard hydrophones distributed over an interior of the cylindrical surface;

winding the towed line array on an exterior of the cylindrical surface;

receiving acoustic data with the calibrated reference standard hydrophones;

transmitting with an acoustic projector, continuous Gaussian distributed broadband noise such that statistics of an acoustic field in a volume of water occupied by the measurement apparatus are stationary;

calculating acoustic transfer functions between one of the plurality of calibrated reference standard hydrophones as a principle reference standard hydrophone and each of the remaining calibrated reference standard hydrophones by using $$H_{pn}(f, \theta_n, z_n) = \frac{P_{np}(f)}{P_{pp}(f)}$$

wherein $H_{pn}$ is an acoustic transfer function between the principle calibrated reference standard hydrophone p and a $n^{th}$ auxiliary reference located at azimuth angle $\theta_n$ and vertical displacement $z_n$ given as the ratio of cross spectrum $P_{np}$ and autospectrum $P_{pp}$ of the principle calibrated reference standard hydrophone; and generating with the acoustic transfer functions, an empirical model of an acoustic field over a continuous surface of the towed line array and the calibrated reference standard hydrophones.

2. The method of claim 1 wherein a free field voltage sensitivity $M_i$ of one of the data channels is calculated using $$M_i(f) = \frac{V_i(f)}{V_p(f)} \frac{M_p(f)}{H_{pi}(f, \theta_i, z_i)}$$

where $M_p$ and $V_p$ are a free field voltage sensitivity and voltage observed on the principle calibrated reference standard hydrophone, a voltage observed on a $i^{th}$ hydrophone of the line array is $V_i$, and f is a frequency.

3. The method of claim 1 wherein a free field voltage sensitivity of one of the data channels in which the data channel is comprised of a plurality of interconnected hydrophones that span a portion of the towed line array, is calculated using $$M_i(f) = \frac{V_i(f)}{V_p(f)} \frac{M_p(f)}{\frac{R}{L}\int_{\theta_1}^{\theta_2} H_{pi}(f, \theta, z)d\theta}$$

where $M_p$, and $V_p$ are free field voltage sensitivity and voltage observed on the principle calibrated reference standard hydrophone, voltage observed on the $i^{th}$ hydrophone group of the line array is $V_i$, $H_{pi}$ is an acoustic transfer function between the principle reference standard hydrophone and all points on the continuous of the towed line array and the calibrated reference standard hydrophones integrated between angular limits $\theta_1$ and $\theta_2$ spanned by a hydrophone group length of L with R being a radius of the measurement apparatus with vertical displacement $z_i$ of a $i^{th}$ hydrophone group assumed constant and f as a frequency.

4. A system for calibration of free field voltage sensitivity of hydrophone data channels in a towed line array, said system comprising:
 a cylindrical frame having a plurality of circular tubes positioned perpendicular to a longitudinal axis with each of said circular tubes spaced apart from each other and connected to each other by a plurality of longitudinal tubes positioned parallel to the longitudinal axis wherein said cylindrical frame is capable of holding the towed array on an exterior of said cylindrical frame at positions parallel to said circular tubes;
 a plurality of calibrated reference standard hydrophones attached within said cylindrical frame;
 a lifting device attached to an uppermost of said circular tubes when said cylindrical frame is in a vertical position wherein said lifting device is capable of suspending said cylindrical frame;
 an acoustic projector suspended from said lifting device along the longitudinal axis to be within an interior of said plurality of circular tubes; and
 a test control and data processor operationally connected to said cylindrical frame and said acoustic projector, for transmitting acoustic signals and collecting acoustic data from the towed array and said calibrated reference standard hydrophones.

5. The system of claim 4, said system further comprising a vibration isolator positioned between said lifting device and said acoustic projector wherein said vibration isolator is capable of minimizing vibration into the towed line array and said calibrated reference standard hydrophones.

6. The system of claim 5 wherein said circular tubes and said longitudinal tubes are perforated by a plurality of holes that allow water to enter and air to escape when submerged.

\* \* \* \* \*